(12) United States Patent
Nguyen et al.

(10) Patent No.: US 9,688,891 B2
(45) Date of Patent: Jun. 27, 2017

(54) FIBER REINFORCED POLYMER COMPOSITE WITH A HARD INTERPHASE

(71) Applicant: Toray Industries, Inc., Tokyo (JP)

(72) Inventors: Felix N. Nguyen, Tacoma, WA (US);
Kenichi Yoshioka, Tacoma, WA (US);
Swezin Than Tun, Tacoma, WA (US);
Alfred P. Haro, Tacoma, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 38 days.

(21) Appl. No.: 14/650,138

(22) PCT Filed: Dec. 23, 2013

(86) PCT No.: PCT/IB2013/002998
§ 371 (c)(1),
(2) Date: Jun. 5, 2015

(87) PCT Pub. No.: WO2014/102603
PCT Pub. Date: Jul. 3, 2014

(65) Prior Publication Data
US 2015/0315430 A1 Nov. 5, 2015

Related U.S. Application Data

(60) Provisional application No. 61/901,909, filed on Nov. 8, 2013, provisional application No. 61/746,213, filed on Dec. 27, 2012.

(51) Int. Cl.
| | | |
|---|---|---|
| B32B 5/28 | (2006.01) |
| B32B 27/04 | (2006.01) |
| B32B 27/20 | (2006.01) |
| C09J 163/00 | (2006.01) |
| C08J 5/04 | (2006.01) |
| C08K 3/36 | (2006.01) |
| C08J 5/24 | (2006.01) |
| C08J 5/00 | (2006.01) |
| C08J 5/10 | (2006.01) |
| B32B 27/38 | (2006.01) |

(52) U.S. Cl.
CPC ............ *C09J 163/00* (2013.01); *C08J 5/005* (2013.01); *C08J 5/04* (2013.01); *C08J 5/042* (2013.01); *C08J 5/10* (2013.01); *C08J 5/24* (2013.01); *C08K 3/36* (2013.01); *C08J 2363/00* (2013.01); *C08J 2363/02* (2013.01); *C08J 2363/04* (2013.01)

(58) Field of Classification Search
None
See application file for complete search history.

(56) References Cited

U.S. PATENT DOCUMENTS

| | | |
|---|---|---|
| 5,541,238 A | 7/1996 | Yamada |
| 5,648,407 A | 7/1997 | Goetz |
| 6,894,113 B2 | 5/2005 | Court |
| 7,820,760 B2 | 10/2010 | Pham |
| 2010/0280151 A1 | 11/2010 | Nguyen |
| 2013/0344325 A1* | 12/2013 | Nguyen .................. B32B 5/10 428/343 |

FOREIGN PATENT DOCUMENTS

| | | |
|---|---|---|
| EP | 1632533 | 3/2006 |
| EP | 2123711 | 11/2009 |
| JP | 06123067 | 5/1994 |
| JP | 08157620 | 6/1996 |
| JP | 11505567 | 5/1999 |
| JP | 2012149237 | 8/2012 |
| WO | 2012116261 | 8/2012 |

OTHER PUBLICATIONS

Machine translation of JP 2012-149237 (no. date).*
"Torayca® Explanation of Product Code", by Toray Carbon Fibers America, Inc (no. date).*
International Search Report for International Application No. PCT/IB2013/002998 mailed Apr. 15, 2014.
Rich, M.J., et al., "Round robin assessment of the single fiber fragmentation test," Oct. 21-23, 2002, paper 158, Proceedings of the American Society for Composites: 17th Technical Conference, Purdue University.
Sun, C., et al., "A review of the different techniques for solid surface acid-base characterization," Sep. 18, 2003, pp. 151-175, vol. 105, Issues 1-3, Advances in Colloid and Interface Science (abstract only).
Sun, C., et al., "Effect of moisture on the surface free energy and acid-base properties of mineral oxides," Sep. 6, 2002, pp. 59-72, vol. 969, Issues 1-2, Journal of Chromatography A (abstract only).
Written Opinion of the International Searching Authority for International Application No. PCT/IB2013/002998 mailed Apr. 15, 2014.
International Preliminary Report on Patentability issued Jun. 30, 2015 for International Application No. PCT/IB2013/002998.

* cited by examiner

*Primary Examiner* — Michael J Feely
(74) *Attorney, Agent, or Firm* — RatnerPrestia

(57) ABSTRACT

A fiber reinforced polymer composition is provided comprising a fiber and an adhesive composition, wherein the adhesive composition comprises at least a thermosetting resin, a curing agent, and a hard interfacial material. When cured, the adhesive composition forms good bonds to the reinforcing fiber, and an interfacial region between the reinforcing fiber and the adhesive composition is formed which comprises the hard interfacial material. Additional embodiments include a prepreg and a method of manufacturing a composite article by curing the adhesive composition and the reinforcing fiber.

7 Claims, 1 Drawing Sheet

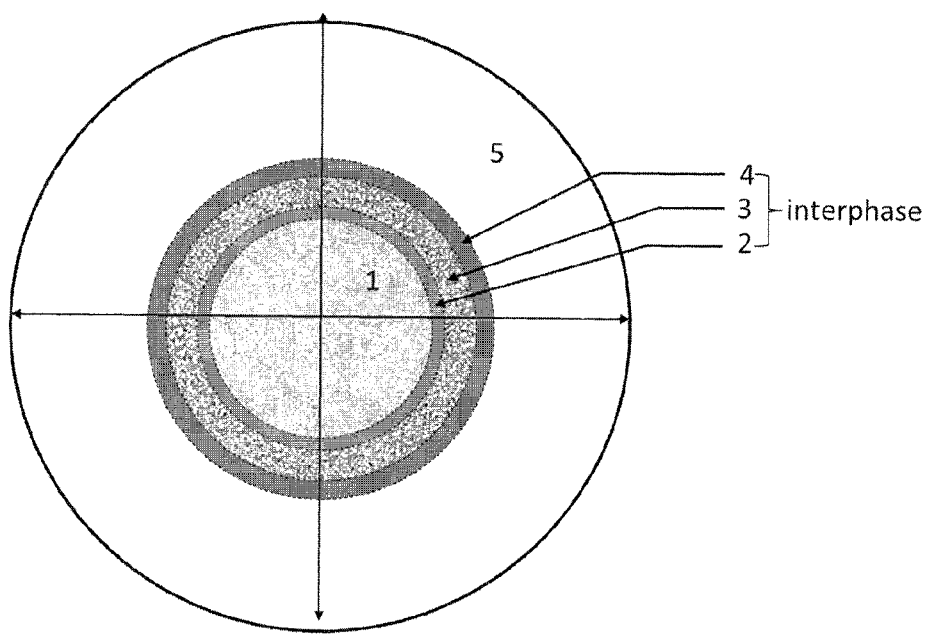

FIBER REINFORCED POLYMER COMPOSITE WITH A HARD INTERPHASE

CROSS-REFERENCE TO RELATED APPLICATIONS

This application is a U.S. National Phase Application of International Application No. PCT/IB2013/002998, filed Dec. 23, 2013 which claims priority of U.S. Provisional Application No. 61/901,909, filed Nov. 8, 2013 and U.S. Provisional Application No. 61/746,213, filed Dec. 27, 2012. The disclosures of each of these applications are incorporated herein by reference in their entirety for all purposes.

FIELD OF THE INVENTION

The present application provides an innovative fiber reinforced polymer composition comprising a reinforcing fiber and an adhesive composition comprising at least a thermosetting resin, a curing agent and an interfacial material having at least a component comprising a glass transition temperature of at least $-50°$ C. and a modulus ratio to the modulus of the adhesive composition of at least 0.1, wherein when cured an interfacial region between the reinforcing fiber and the adhesive composition comprises the interfacial material, and the adhesive composition forms good bonds to the reinforcing fiber, thus allowing at least high interfacial shear strength and open-hole compression.

BACKGROUND OF THE INVENTION

When bonding reinforcing fibers together by a resin matrix to create a fiber reinforced polymer composite, the presence of functional groups on the fiber's surface is very critical. In addition, the bond has to be durable when subjected to environmental and/or hostile conditions. Bond strength, i.e., the force per unit of interfacial area required to separate the (cured) resin from the fiber that is in contact with the cured resin, is a measure of adhesion. Maximum adhesion is obtained when a cohesive failure of either the resin or the fiber or both, as opposed to an adhesive failure between the fiber and the resin, is mainly observed.

To make a strong bond, firstly oxygen functional groups are beneficially introduced on the pristine fiber's surface; secondly an adhesion promoter may be selected such that one end of the adhesion promoter is capable of covalently bonding to the oxygen functional groups on the fiber's surface while another end of the adhesion promoter is capable of promoting or participating in chemical interactions with functional groups in the resin. Essentially, the adhesion promoter acts as a bridge connecting the fiber to the bulk resin during curing. A surface treatment such as plasma, UV, corona discharge, or wet electro-chemical treatment is often used to introduce oxygen functional groups onto the fiber's surface.

Ultimately, to achieve the strong bond, there certainly cannot be voids at the interface between the fiber and the resin, i.e., there is sufficient molecular contact between them upon curing. Often, this interface is considered as a volumetric region or an "interphase". The interphase can extend from the fiber's surface a few nanometers up to several micrometers, depending on the chemical composition on the sized fiber's surface, chemical interactions between the fiber and the bulk resin, and the migration of other chemical moieties to the interface during curing. The interphase, therefore, has a very unique composition, and its properties are far different from those of the fiber's surface and the bulk resin. Moreover, the existence of high stress concentrations in the interphase due to the modulus mismatch between the fiber and the resin often makes the composite vulnerable to crack initiation. Such high stress concentrations could be intensified by chemical embrittlement of the resin induced by the fiber, and local residual stress due to the thermal expansion coefficient difference such that when a load is applied, a catastrophic failure of the composite can be observed.

Conventionally, inadequate adhesion might allow crack energy to be dissipated along the fiber/matrix interface, but at the great expense of stress transfer capability from the adhesive through the interphase to the fibers. Strong adhesion, on the other hand, often results in an increase in interfacial matrix embrittlement, allowing cracks to initiate in these regions and propagate into the resin-rich areas. In addition, crack energy at a fiber's broken end cannot be relieved along the fiber/matrix interface, and therefore, diverted into neighboring fibers by essentially breaking them. For these reasons, current state-of-the-art fiber composite systems are designed to allow an optimal adhesion level.

In some cases, especially involving carbon fibers, weak to intermediate adhesion levels are desired so that there is a balance between adhesion related properties such as tensile strength and compressive properties such as compression strength and open-hole compression (OHC) strength. Typically a higher resin modulus mainly gives rise to higher compressive strengths. However, up to a certain (flexural) resin modulus between 4-5 GPa, these strengths are leveled out and will not increase further. The reason could be due to a weak interphase that is not suitable to prevent fibers from premature failures from buckling. A high resin modulus, on the other hand, could cause the polymer to be brittle and therefore could result in low tensile-related properties as well as low fracture toughness.

Recently, composite materials have been utilized successfully in commercial aircrafts due to their high specific strength and stiffness over metal alloys, as seen in Boeing 787 and Airbus 380 and 350 aircrafts. More specifically, carbon fiber composite materials allow designs of thin and high aspect ratio wings that could not be achieved with metal alloys, resulting in better aerodynamic efficiency by drag reductions. Such designs are anticipated to require high torsional and bending stiffness of the composite materials. Therefore, there are needs to overcome the above barriers in compressive strengths as well as tensile-related strengths and fracture toughness.

WO2012116261A1 (Nguyen et al., Toray Industries Inc., 2012) attempted to create an interphase by a self-assembled process in which an interfacial material is incorporated into a resin and by utilizing surface chemistry of a reinforcing fiber to concentrate the interfacial material in the vicinity of the fiber. This process has been shown to be robust, forming a reinforced interphase that in turn could simultaneously improve tensile strength and fracture toughness of the composite by utilizing a rubbery interfacial material. However, since this soft interphase was created, it would not have been able to effectively prevent fibers from buckling under a compression load. In addition, though the interphase's modulus could not be measured directly, such a soft interphase while having high fracture toughness could have low modulus, and thus could reduce load transfer capability of the polymer to the reinforcing fiber, especially when the fiber is a high modulus carbon fiber. As a result, there is a need to create a hard interphase, without penalizing too much of its fracture toughness, that could simultaneously provide good adhesion hence high adhesion-related properties and improve compressive properties.

SUMMARY OF THE INVENTION

An embodiment of the invention relates to a fiber reinforced polymer composition comprising a reinforcing fiber and an adhesive composition, wherein the adhesive composition comprises at least a thermosetting resin, a curing agent and an interfacial material having at least a component with a glass transition temperature (Tg) of at least −50° C., wherein a surface of the interfacial material comprises at least a functional group compatible with the reinforcing fiber, wherein the reinforcing fiber is suitable for concentrating the interfacial material in an interfacial region between the reinforcing fiber and the adhesive composition, wherein the interfacial region comprises an adhesion layer and a hard layer, wherein the adhesion layer is closer to the reinforcing fiber than the hard layer and has a composition different from the composition of the hard layer, and wherein the hard layer comprises at least the interfacial material. The adhesive composition when cured forms good bonds to the reinforcing fiber, in one embodiment of the invention. The functional group of the interfacial material may comprise at least one of an oxygen-containing group, a nitrogen-containing group (for example, an amine group or an amide group) or a sulfur-containing group. The component of the interfacial material may have a modulus effective to provide a ratio of the modulus of the interfacial material to the modulus of the adhesive composition of at least 0.1. The adhesive composition may further comprise at least one of a migrating agent, an accelerator, a thermoplastic resin, a toughener, an interlayer toughener.

Another embodiment relates to a fiber reinforced polymer composition comprising a reinforcing fiber and an adhesive composition, wherein the adhesive composition comprises at least a thermosetting resin, a curing agent and a hard interfacial material, wherein the fiber reinforced polymer composition when cured has an interfacial region comprising the hard interfacial material and has a compression strength of at least 1240 MPa (180 ksi) and an open-hole compression of at least 300 MPa (43.5 ksi). The adhesive composition may further comprise at least one of a migrating agent, an accelerator, a thermoplastic resin, a toughener, and/or an interlayer toughener.

Other embodiments relate to a method of manufacturing a fiber reinforced polymer composition.

Other embodiments relate to a prepreg comprising one of the above fiber reinforced polymer compositions.

Other embodiments relate to a method of manufacturing a composite article comprising curing one of the above fiber reinforced polymer compositions.

BRIEF DESCRIPTIONS OF THE DRAWING

FIG. 1 shows a schematic of a multilayered interphase, including carbon fiber (1). Adhesion layer (2) comprises at least a sizing material and a functional group on the fiber's surface. Hard layer (3) comprises at least a hard interfacial material. Outer layer (4) comprises a composition substantially similar to the bulk resin composition (5). The hard interphase comprises at least adhesion layer (2) and hard layer (3).

DETAILED DESCRIPTION OF THE INVENTION

An embodiment of the invention relates to a fiber reinforced polymer composition comprising a reinforcing fiber and an adhesive composition, wherein the adhesive composition comprises at least a thermosetting resin, a curing agent and an interfacial material having at least a component with a glass transition temperature (Tg) of at least −50° C., wherein a surface of the interfacial material comprises at least a functional group compatible with the reinforcing fiber, wherein the reinforcing fiber is suitable for concentrating the interfacial material in an interfacial region between the reinforcing fiber and the adhesive composition (herein referred to as 'an interphase'), wherein the interfacial region comprises an adhesion layer and a hard layer, wherein the adhesion layer is closer to the reinforcing fiber than the hard layer and has a composition different from the composition of the hard layer, and wherein the hard layer comprises at least the interfacial material.

In this embodiment, any reinforcing fiber suitable for concentrating the interfacial material in an interfacial region between the reinforcing fiber and the adhesive composition could be used. Such reinforcing fiber, in various embodiments of the invention, has a non-polar surface energy at 30° C. of at least 30 mJ/m$^2$, at least 40 mJ/m$^2$, or even at least 50 mJ/m$^2$ and/or a polar surface energy at 30° C. of at least 2 mJ/m$^2$, at least 5 mJ/m$^2$, or even at least 10 mJ/m$^2$. High surface energies are needed to promote wetting of the adhesive composition on the reinforcing fiber and to promote concentration of the interfacial material in the vicinity of the reinforcing fiber. This condition is also necessary to promote good bonds.

Non-polar and polar surface energies could be measured by an inverse gas chromatography (IGC) method using vapors of probe liquids and their saturated vapor pressures. IGC can be performed according to Sun and Berg's publications (Advances in Colloid and Interface Science 105 (2003) 151-175 and Journal of Chromatography A, 969 (2002) 59-72). A brief summary is described in the paragraph below.

Vapors of known liquid probes are carried into a tube packed with solid materials of unknown surface energy and interacted with the surface. Based on the time that a gas traverses through the tube and the retention volume of the gas, the free energy of adsorption can be determined. Hence, the non-polar surface energy can be determined from a series of alkane probes, whereas the polar surface energy can be roughly estimated using two acid/base probes.

There are no specific limitations or restrictions on the choice of a reinforcing fiber, as long as it is suitable for concentrating the interfacial material in an interfacial region between the reinforcing fiber and the adhesive composition. Examples include carbon fibers, organic fibers such as aramid fibers, silicon carbide fibers, metal fibers (e.g., alumina fibers), boron fibers, tungsten carbide fibers, glass fibers, and natural/bio fibers. Carbon fiber in particular is used to provide the cured fiber reinforced polymer composition exceptionally high strength and stiffness as well as light weight. Of all carbon fibers, those with a strength of 2000 MPa or higher, an elongation of 0.5% or higher, and modulus of 200 GPa or higher are preferably used.

The form and the arrangement of a plurality of the reinforcing fibers used are not specifically defined. Any of the forms and spatial arrangements of the reinforcing fibers known in the art such as long fibers in a direction, chopped fibers in random orientation, single tow, narrow tow, woven fabrics, mats, knitted fabrics, and braids can be employed. The term "long fiber" as used herein refers to a single fiber that is substantially continuous over 10 mm or longer or a fiber bundle comprising the single fibers. The term "short fibers" as used herein refers to a fiber bundle comprising fibers that are cut into lengths of shorter than 10 mm. Particularly in the end use applications for which high specific strength and high specific elastic modulus are required, a form wherein a reinforcing fiber bundle is arranged in one direction may be most suitable. From the viewpoint of ease of handling, a cloth-like (woven fabric) form is also suitable for the present invention.

In cases when the reinforcing fiber is a carbon fiber, instead of using surface energies as described above for a selection of suitable carbon fibers for concentrating the interfacial material, an interfacial shear strength (IFSS) value of at least 10 MPa, at least 20 MPa, at least 25 MPa, or even at least 30 MPa, determined in a single fiber fragmentation test (SFFT) according to Rich et al. in "Round Robin Assessment of the Single Fiber Fragmentation Test" in *Proceeding of the American Society for Composites: 17th Technical conference* (2002), paper 158 could be needed. A brief description of SFFT is described in a paragraph below.

A single fiber composite coupon having a single carbon fiber embedded in the center of a dog-boned cured resin is strained without breaking the coupon until the set fiber length no longer produces fragments. IFSS is determined from the fiber strength, the fiber diameter, and the critical fragment length determined by the set fiber length divided by the number of fragments.

In order to achieve such high IFSS, the carbon fiber typically is oxidized or surface treated by an available method in the art (e.g., plasma treatment, UV treatment, plasma assisted microwave treatment, and/or wet chemical-electrical oxidization) to increase its concentration of oxygen to carbon (O/C). The O/C concentration can be measured by an X-ray photoelectron spectroscopy (XPS). A desired O/C concentration may be at least 0.05, at least 0.1, or even at least 0.15. The oxidized carbon fiber is coated with a sizing material such as an organic material or organic/inorganic material such as a silane coupling agent or a silane network or a polymer composition compatible and/or chemically reactive with the adhesive composition to improve bonding strengths. For example, if the adhesive resin composition comprises an epoxy, the sizing material could have functional groups such as epoxy groups, amine groups, amide groups, carboxylic groups, carbonyl groups, hydroxyl groups, and other suitable oxygen-containing or nitrogen-containing groups. Both the O/C concentration on the surface of the carbon fiber and the sizing material collectively are selected to promote adhesion of the adhesive composition to the carbon fiber. There is no restriction on the possible choices of the sizing material and a desired O/C concentration as long as the requirement of surface energies of the carbon fiber for an interphase formation is met and/or the sizing promotes good bonds.

Good adhesion between the adhesive composition and the reinforcing fiber herein refers to "good bonds" in that one or more components of the adhesive composition chemically react with functional groups found on the reinforcing fiber's surface to form cross-links. Good bonds in one embodiment can be documented by examining the cured fiber reinforced polymer composition after being fractured under a scanning electron microscope (SEM) for failure modes. Adhesive failure refers to a fracture failure at the interface between the reinforcing fiber and the cured adhesive composition, exposing the fiber's surface with little or no adhesive found on the surface. Cohesive failure refers to a fracture failure which occurs in the cured adhesive composition, wherein the fiber's surface is mainly covered with the adhesive composition. Note that cohesive failure in the fiber may occur, but it is not referred to in the invention herein. The coverage of the fiber surface with the cured adhesive composition could be about 50% or more, or about 70% or more. Mixed mode failure refers to a combination of adhesive failure and cohesive failure. Adhesive failure refers to weak adhesion and cohesive failure is strong adhesion, while mixed mode failure results in adhesion somewhere in between weak adhesion and strong adhesion and typically has a coverage of the fiber surface by the cured adhesive composition of about 20% or more. Mixed mode and cohesive failures herein are referred to as a good bond between the cured adhesive composition and the fiber surface while adhesive failure constitutes a poor bond. To have good bonds between carbon fibers and the cured adhesive composition an IFSS value of at least 15 MPa could be needed. Alternatively, a measurement of fiber-matrix adhesion could be obtained by interlaminar shear strength (ILSS) described by ASTM D-2344 of the cured fiber reinforced polymer composition. Good bonds could refer to an IFSS of at least 20 MPa, at least 25 MPa, at least 30 MPa or even 35 MPa and/or a value of ILSS of at least 13, at least 14 ksi, at least 15 ksi, at least 16 ksi, or even at least 17 ksi. Ideally, both an observation of failure modes and an IFSS value are needed to confirm good bonds. However, generally, when either observations of failure modes or an IFSS value cannot be obtained, an ILSS value between 13-14 ksi could indicate a mixed mode failure while an ILSS value above 16 ksi could indicate a cohesive failure and an ILSS value between 14-15 ksi could indicate either mixed mode or cohesive failure, depending on the reinforcing fiber and the adhesive composition.

The thermosetting resin in the adhesive composition may be defined herein as any resin which can be cured with a curing agent or a cross-linker compound by means of an externally supplied source of energy (e.g., heat, light, electromagnetic waves such as microwaves, UV, electron beam, or other suitable methods) to form a three dimensional crosslinked network having the required resin modulus. The thermosetting resin may be selected from, but is not limited to, epoxy resins, epoxy novolac resins, ester resins, vinyl ester resins, cyanate ester resins, maleimide resins, bismaleimide-triazine resins, phenolic resins, novolac resins, resorcinolic resins, unsaturated polyester resins, diallyl-phthalate resins, urea resins, melamine resins, benzoxazine resins, polyurethanes, and mixtures thereof and mixtures thereof, as long as it contributes to the formation of the interphase and the required resin modulus and the good bonds satisfy the above conditions.

From the view point of an exceptional balance of strength, strain, modulus and environmental effect resistance, of the above thermosetting resins, epoxy resins could be used, including mono-, di-functional, and higher functional (or multifunctional) epoxy resins and mixtures thereof. Multifunctional epoxy resins are preferably selected as they provide excellent glass transition temperature (Tg), modulus and even high adhesion to a reinforcing fiber. These epoxies are prepared from precursors such as amines (e.g., epoxy resins prepared using diamines and compounds containing at least one amine group and at least one hydroxyl group such as tetraglycidyl diaminodiphenyl methane, triglycidyl-p-aminophenol, triglycidyl-m-aminophenol, triglycidyl aminocresol and tetraglycidyl xylylenediamine and their isomers), phenols (e.g., bisphenol A epoxy resins, bisphenol F epoxy resins, bisphenol S epoxy resins, bisphenol R epoxy resins, phenol-novolac epoxy resins, cresol-novolac epoxy resins and resorcinol epoxy resins), naphthalene epoxy resins, dicyclopentadiene epoxy resins, epoxy resins having a biphenyl skeleton, isocyanate-modified epoxy resins and compounds having a carbon-carbon double bond (e.g., alicyclic epoxy resins). It should be noted that the epoxy resins are not restricted to the examples above. Halogenated epoxy resins prepared by halogenating these epoxy resins can also be used. Furthermore, mixtures of two or more of these epoxy resins, and compounds having one epoxy group or monoepoxy compounds such as glycidylaniline, glycidyl toluidine or other glycidylamines (particularly glycidylaromatic amines) can be employed in the formulation of the thermosetting resin matrix.

Examples of commercially available products of bisphenol A epoxy resins include "jER (registered trademark)" 825, "jER (registered trademark)" 828, "jER (registered trademark)" 834, "jER (registered trademark)" 1001, "jER (registered trademark)" 1002, "jER (registered trademark)" 1003, "jER (registered trademark)" 1003F, "jER (registered trademark)" 1004, "jER (registered trademark)" 1004AF, "jER (registered trademark)" 1005F, "jER (registered trademark)" 1006FS, "jER (registered trademark)" 1007, "jER (registered trademark)" 1009 and "jER (registered trademark)" 1010 (which are manufactured by Mitsubishi Chemical Corporation). Examples of commercially available products of the brominated bisphenol A epoxy resin include "jER (registered trademark)" 505, "jER (registered trademark)" 5050, "jER (registered trademark)" 5051, "jER (registered trademark)" 5054 and "jER (registered trademark)" 5057 (which are manufactured by Mitsubishi Chemical Corporation). Examples of commercially available products of the hydrogenated bisphenol A epoxy resin include ST5080, ST4000D, ST4100D and ST5100 (which are manufactured by Nippon Steel Chemical Co., Ltd.).

Examples of commercially available products of bisphenol F epoxy resins include "jER (registered trademark)" 806, "jER (registered trademark)" 807, "jER (registered trademark)" 4002P, "jER (registered trademark)" 4004P, "jER (registered trademark)" 4007P, "jER (registered trademark)" 4009P and "jER (registered trademark)" 4010P (which are manufactured by Mitsubishi Chemical Corporation), and "Epotohto (registered trademark)" YDF2001 and "Epotohto (registered trademark)" YDF2004 (which are manufactured by Nippon Steel Chemical Co., Ltd.). An example of a commercially available product of the tetramethyl-bisphenol F epoxy resin is YSLV-80XY (manufactured by Nippon Steel Chemical Co., Ltd.).

An example of a bisphenol S epoxy resin is "Epiclon (registered trademark)" EXA-154 (manufactured by DIC Corporation).

Examples of commercially available products of tetraglycidyl diaminodiphenyl methane resins include "Sumiepoxy (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720 and MY721 (which are manufactured by Huntsman Advanced Materials). Examples of commercially available products of triglycidyl aminophenol or triglycidyl aminocresol resins include "Sumiepoxy (registered trademark)" ELM100 (manufactured by Sumitomo Chemical Co., Ltd.), "Araldite (registered trademark)" MY0500, MY0510 and MY0600 (which are manufactured by Huntsman Advanced Materials) and "jER (registered trademark)" 630 (manufactured by Mitsubishi Chemical Corporation). Examples of commercially available products of tetraglycidyl xylylenediamine and hydrogenated products thereof include TETRAD-X and TETRAD-C (which are manufactured by Mitsubishi Gas Chemical Company, Inc.).

Examples of commercially available products of phenol-novolac epoxy resins include "jER (registered trademark)" 152 and "jER (registered trademark)" 154 (which are manufactured by Mitsubishi Chemical Corporation), and "Epiclon (registered trademark)" N-740, N-770 and N-775 (which are manufactured by DIC Corporation).

Examples of commercially available products of cresol-novolac epoxy resins include "Epiclon (registered trademark)" N-660, N-665, N-670, N-673 and N-695 (which are manufactured by DIC Corporation), and EOCN-1020, EOCN-102S and EOCN-104S (which are manufactured by Nippon Kayaku Co., Ltd.).

An example of a commercially available product of a resorcinol epoxy resin is "Denacol (registered trademark)" EX-201 (manufactured by Nagase chemteX Corporation).

Examples of commercially available products of naphthalene epoxy resins include HP-4032, HP4032D, HP-4700, HP-4710, HP-4770, EXA-4701, EXA-4750, EXA-7240 (which are manufactured by DIC Corporation)

Examples of commercially available products of dicyclopentadiene epoxy resins include "Epiclon (registered trademark)" HP7200, HP7200L, HP7200H and HP7200HH (which are manufactured by DIC Corporation), "Tactix (registered trademark)" 558 (manufactured by Huntsman Advanced Material), and XD-1000-1L and XD-1000-2L (which are manufactured by Nippon Kayaku Co., Ltd.).

Examples of commercially available products of epoxy resins having a biphenyl skeleton include "jER (registered trademark)" YX4000H, YX4000 and YL6616 (which are manufactured by Mitsubishi Chemical Corporation), and NC-3000 (manufactured by Nippon Kayaku Co., Ltd.).

Examples of commercially available products of isocyanate-modified epoxy resins include AER4152 (manufactured by Asahi Kasei Epoxy Co., Ltd.) and ACR1348 (manufactured by ADEKA Corporation) each of which has an oxazolidone ring.

The thermosetting resin may comprise both a tetrafunctional epoxy resin (in particular, a tetraglycidyl diaminodiphenyl methane epoxy resin) and a difunctional glycidylamine, in particular a difunctional glycidyl aromatic amine such as glycidyl aniline or glycidyl toluidine from the viewpoint of the required resin modulus. Another difunctional epoxy resin, such as a difunctional bisphenol A or F/epichlorohydrin epoxy resin could be used to provide an increase in a flexural deflection of the cured adhesive composition; the average epoxy equivalent weight (EEW) of the difunctional epoxy resin may be, for example from 177 to 1500, for example. For example, the thermosetting resin may comprise 50 to 70 weight % tetrafunctional epoxy resin, 10 to 30 weight percent difunctional bisphenol A or F/epichlorohydrin epoxy resin, and 10 to 30 weight percent difunctional glycidyl aromatic amine.

The adhesive composition also includes a curing agent or a cross-linker compound. There are no specific limitations or restrictions on the choice of a compound as the curing agent, as long as it has at least one active group which reacts with the thermosetting resin and collectively provides the required resin modulus and/or promotes adhesion.

For the above epoxy resins, examples of suitable curing agents include polyamides, dicyandiamide [DICY], amidoamines (e.g., aromatic amidoamines such as aminobenzamides, aminobenzanilides, and aminobenzenesulfonamides), aromatic diamines (e.g., diaminodiphenylmethane, diaminodiphenylsulfone [DDS]), aminobenzoates (e.g., trimethylene glycol di-p-aminobenzoate and neopentyl glycol di-p-amino-benzoate), aliphatic amines (e.g., triethylenetetramine, isophoronediamine), cycloaliphatic amines (e.g., isophorone diamine), imidazole derivatives, guanidines such as tetramethylguanidine, carboxylic acid anhydrides (e.g., methylhexahydrophthalic anhydride), carboxylic acid hydrazides (e.g., adipic acid hydrazide), phenol-novolac resins and cresol-novolac resins, carboxylic acid amides, polyphenol compounds, polysulfides and mercaptans, and Lewis acids and bases (e.g., boron trifluoride ethylamine, tris-(diethylaminomethyl) phenol). Depending on the desired properties of the cured fiber reinforced epoxy composition, a suitable curing agent or suitable combination of curing agents is selected from the above list. For example, if dicyandiamide is used, it will generally provide the product with good elevated-temperature properties, good chemical resistance, and a good combination of tensile and peel strength. Aromatic diamines, on the other hand, will typically give high heat and chemical resistance and high modulus. Aminobenzoates will generally provide excellent tensile elongation though they often provide inferior heat resistance compared to aromatic diamines. Acid anhydrides generally provide the resin matrix with low viscosity and excellent workability, and subsequently, high heat resistance after curing. Phenol-novolac resins and cresol-novolac resins provide moisture resistance due to the formation of ether bonds, which have excellent resistance to hydrolysis. Note that a mixture of two or more above curing agents could be employed. For example, by using DDS together with DICY as the hardener, the reinforcing fiber and the adhesive composition could adhere more firmly, and in particular, the heat resistance, the mechanical properties such as compressive strength, and the environmental resistance of the fiber reinforced composite material obtained may be markedly enhanced. In another example when DDS is combined with an aromatic amidoamine (e.g., 3-aminobenzamide), an excellent balance of thermal, mechanical properties and environmental resistance could be achieved.

The adhesive composition in the present invention is required to contain an interfacial material having at least one component comprising a "hard material." "Hard material", as used herein, refers to a material having a glass transition temperature (Tg) higher than that of a rubbery material, specifically a Tg of at least −50° C. The interfacial material may additionally comprise at least one further component which has a Tg less than −50° C. (e.g., the interfacial material may comprise a first component having a Tg of at least −50° C. and a second component having a Tg less than −50° C.). In one embodiment, the entirety of the interfacial material has a Tg of at least −50° C. The resulting interfacial material is referred to herein as a "hard interfacial material" or simply as an "interfacial material." Such hard interfacial material is required to increase primarily compressive properties such as compression and open-hole compression (OHC) without penalizing other properties, as opposed to softer interfacial materials that could mainly provide improvement in tensile strengths such as tension, open-hole tension and mode I fracture toughness and yet might reduce compressive properties. The component of the interfacial material in other embodiments could have a Tg of at least 0° C., at least 25° C. or even at least 50° C. In addition, either the component or the interfacial material collectively could have a modulus such that the ratio of the modulus of the component or the interfacial material to the modulus of the adhesive composition is at least 0.1, at least 0.5, or even at least 1. The higher Tg and/or the higher ratio of the component could lead to a harder interfacial material collectively. The harder the interfacial material, the more improvement in compressive properties can be achieved.

There are no specific limitations or restrictions on the choice of a compound as the hard interfacial material, as long as it can migrate to the vicinity of the reinforcing fiber and preferably stay there due to its surface chemistry being more compatible with the substances on the reinforcing fiber than with the substances present in the bulk adhesive composition. The hard interfacial material subsequently becomes a part of the interphase. Compatibility herein refers to chemically like molecules, or chemically alike molecules, or molecules whose chemical makeup comprises similar atoms or structure, or molecules that associate with one another and possibly chemically interact with one another. Compatibility implies solubility of one component in another component and/or reactivity of one component with another component. "Not compatible/incompatible" or "does not like" refers to a phenomenon wherein the migrating agent, when present at a certain amount (concentration) in the adhesive composition, causes the interfacial material, which in the absence of the migrating agent would have been uniformly distributed in the adhesive composition after curing, to be not uniformly distributed to some extent. The interfacial material is insoluble or partially soluble in the adhesive composition after the adhesive composition is cured, and may have a longest dimension of less than the fiber's diameter, e.g., less than 5 µm, less than 1 µm, less than 500 nm, or even less than 250 nm. A shorter dimension allows the interfacial material to flow into the fiber bed comprising a plurality of fibers easier while a longer dimension could lead to a filtering effect in that a majority of the material is concentrated outside the fiber bed. The interfacial material could be present in the adhesive composition in an amount, for example, of up to 50 phr (50 parts by weight per 100 parts of the thermosetting resin), or between about 1 to about 30 phr. A high amount could be desirable if the interfacial material is required to increase certain properties of the adhesive resin composition such as modulus or electrical/thermal properties. Examples of suitable interfacial materials include, but are not limited, metals or transition metals (e.g., nickel, copper, silver, zinc, gold, platinum, cobalt, tin, titanium, iron, chromium, aluminum), metal alloys (e.g., aluminum alloys, magnesium alloys, lithium aluminum alloys), carbonaceous materials (e.g., carbon nanotubes, carbon black, carbon nanofibers, graphite, graphene, graphene oxide, graphite nanoplatelets, diamond), oxides (e.g., indium tin oxides, silica, alumina, zinc oxides, titania), silicon-based materials (e.g., ceramic, silicon carbide, POSS), polymers, or coated materials, fibrous forms of the above materials where applicable (e.g., nickel nanostrands, alumina nanofibers, halloysite, silica nanofibers), and mixtures thereof.

The interfacial material could be a core-shell material comprising at least a core material and at least a shell material. Either the core material or the shell material, as long as they are chemically different and satisfy Tg and/or modulus requirement(s) of the resulting interfacial material, could be selected from a polymer (e.g., linear polymers, branched polymers, hyperbranched polymers, dendrimers, copolymers and block copolymers) or inorganic materials (e.g., metals, oxides, carbonaceous materials, silicon-based materials). For example, the core could be silica while the shell could be a polymer, or the core could be a polymeric particle (e.g., core-shell particles, soft core/hard shell particles, hard core/soft shell particles) while the shell could be a metal, or the core could be hollow while the inner shell is silica and the outer shell is a metal. Such core and shell materials could be tailored specifically to address combined functions of the interphase or multifunctionality of the interphase in the fiber reinforced polymer composition.

Allowing the fiber reinforced polymer composition to have multifunctionality, herein refers to its capability of carrying loads plus at least one non-load carrying function such as electrical, thermal, thermoelectric, sensing, or health monitoring. Such interfacial materials are herein referred to multifunctional interfacial materials wherein either the core, the shell or both could comprise more than the aforementioned materials. A multifunctional interphase herein comprises the multifunctional interfacial material or combination of interfacial materials having the combined functions of interest and distributed in discrete layers with gradient concentrations.

The interfacial material could have a functional group that is compatible with the surface chemistry of the reinforcing fiber such that the fiber is capable of concentrating the interfacial material in its vicinity. The functional group could be at least one or more of a nitrogen-containing group (e.g., an amine group), an oxygen-containing group (e.g., a hydroxyl group, a methacrylate group, or a carboxylic group), a sulfur containing functional group (e.g., a thio group), an amide group (e.g., an organic amide, a sulphonamide, or a phosphoramide), or a vinyl group. For example, if the reinforcing fiber has an epoxy group or the surface is specified to be compatible with an epoxy resin, the surface of the interfacial material could have at least an epoxy group, a hydroxyl group or a carboxylic group. In another embodiment, the surface of the reinforcing fiber contains a first functional group and the surface of the interfacial material contains a second functional group, wherein the first and second functional group are capable of reacting with each other. In yet another embodiment, the interfacial material could be silica (in particular, nanosilica) functionalized with an epoxy group.

In some cases, especially involving carbon fibers, weak to intermediate adhesion levels are desired, especially when an application such as an aircraft's wing needs a high level of z-direction or through thickness electrical conductivity (hereafter referred to as 'electrical conductivity' or simply 'conductivity'). For these cases the conductive paths through thickness are formed from fiber-fiber touching such that the higher the carbon fiber volume is, the higher the conductivity is obtained. The conductive paths through the fibers, however, are significantly sealed when adhesion is improved, i.e., an insulation layer of the matrix material prevents fiber-fiber touching, thus the conductivity relies on the electrical conductivity of the polymer matrix. Consequently, strong adhesion leads to a significantly reduction in the conductivity of the composite. To regain electrical paths, a conductive material could be incorporated into the resin matrix without changing its strong adhesion to the fibers. Though the conductivity of the resin could be enhanced substantially, only a fraction of the enhancement could be transferred to the composite because the fibers (which occupy typically at least 30% by volume of the composite) would still act as semi-insulators. In such cases, a conductive interphase comprising at least a hard interfacial material including a conductive material or a mixture of a conductive material and a non-conductive material in the fiber reinforced polymer composition is needed. "Conductive", as used herein, refers to the electrical conductivity of a material. In some cases, it also refers to the thermal conductivity, or collectively refers to both electrical and thermal conductivities of the material, or its thermoelectric property, i.e., its capability to generate an electric potential from a temperature difference, or heat from an electric potential difference.

An electrical conductive material herein refers to a material having an electrical conductivity higher than that of the thermosetting resin, of at least $10^{-13}$ S/m, at least $10^{-10}$ S/m, or even $10^{-5}$ S/m, while a non-conductive material is a material having an electrical conductivity of less than $10^{-13}$ S/m.

The interphase of the cured fiber reinforced polymer composition could be formed more robustly when an optional migrating agent is present in the adhesive composition. The migrating agent herein is any material inducing one or more components in the adhesive composition to be more concentrated in an interfacial region between the fiber and the adhesive composition upon curing of the adhesive composition. This phenomenon is a migration process of the interfacial material to the vicinity of the fiber, which hereafter is referred to as particle migration or interfacial material migration. In such a case, it is said that the interfacial material is more compatible with the reinforcing fiber than the migration agent. In some case, it can be said that the interfacial material is attracted to the reinforcing fiber via electrostatic forces.

Any material found more concentrated in a vicinity of the fiber than further away from the fiber or present in the interfacial region or the interphase between the fiber's surface to a definite distance into the cured adhesive composition constitutes an interfacial material in the present adhesive composition. Note that one interfacial material can play the role of a migrating agent for another interfacial agent if it can cause the second interfacial material to have a higher concentration in a vicinity of the fiber than further away from the fiber upon curing of the adhesive composition.

The migrating agent may comprise a polymer, a thermoplastic resin, a thermosetting resin, or a combination thereof. In one embodiment of the invention, the migrating agent is a thermoplastic polymer or combination of thermoplastic polymers. Typically, the thermoplastic polymer additives are selected to modify the viscosity of the thermosetting resin for processing purposes, and/or enhance its toughness, and yet could affect the distribution of the interfacial material in the adhesive composition to some extent. The thermoplastic polymer additives, when present, may be employed in any amount up to 50 phr, or even up to 35 phr for ease of processing. A suitable amount is determined based on its migrating-driving ability versus mobility of the interfacial material restricted by viscosity of the adhesive composition. Note that when the viscosity of the adhesive composition is adequately low, a uniform distribution of the interfacial material in the adhesive composition might not be necessary to promote particle migration onto or near the fiber's surface. As the viscosity of the adhesive composition increases to some extent, a uniform distribution of the interfacial material in the adhesive composition could help improve particle migration onto or near the fiber's surface.

For the migrating agent, one could use, but is not limited to, the following thermoplastic materials such as polyvinyl formals, polyamides, polycarbonates, polyacetals, polyphenyleneoxides, polyphenylene sulfides, polyarylates, polyesters, polyamideimides, polyimides, polyetherimides, polyimides having phenyltrimethylindane structure, polysulfones, polyethersulfones, polyetherketones, polyetheretherketones, polyaramids, polyethernitriles, polybenzimidazoles, their derivatives and their mixtures thereof.

One could use as the migrating agent aromatic thermoplastic polymer additives which do not impair the high thermal resistance and high elastic modulus of the resin. The selected thermoplastic polymer additive could be soluble in the resin to a large extent to form a homogeneous mixture. The thermoplastic polymer additives could be compounds having aromatic skeletons which are selected from the group consisting of polysulfones, polyethersulfones, polyamides, polyamideimides, polyimides, polyetherimides, polyetherketones, and polyetheretherketones, their derivatives, the alike or similar polymers, and mixtures thereof. Polyethersulfones and polyetherimides and mixtures thereof could be of interest due to their exceptional migrating-drive abilities. Suitable polyethersulfones, for example, may have a number average molecular weight of from about 10,000 to about 75,000.

When both migrating agent and interfacial material are present in the adhesive compositions, the migrating agent and the interfacial material may be present in a weight ratio of migrating agent to interfacial material of from about 0.1 to about 30, or from about 0.1 to about 20. This range can be optimized necessarily for particle migration and subsequently the interphase formation.

In the invention, the interfacial region between the reinforcing fiber and the adhesive composition comprises at least the interfacial material to form a reinforced interphase necessary to reduce stress concentration in this region. The composition of the reinforced interphase could be very unique for each fiber reinforced polymer composition to achieve desired properties, even though this may not be capable of being quantitatively documented due to the limitations of current state-of-the-art analytical instruments, and yet presumably comprises functional groups on the fiber surface or surface chemistry, sizing material, interfacial material, and other component(s) in the bulk resin that could migrate into the vicinity of the reinforcing fibers. For carbon fibers in particular, surface functional groups might depend on the modulus of carbon fibers, their surface characteristics, and the type of surface treatment used.

When the cured fiber reinforced polymer composition is under a compressive load, both good adhesion between the reinforcing fiber and the cured adhesive composition through the reinforced interphase and the hardness of the interphase are required to delay premature fiber buckling failures. The interphase in the invention comprises an adhesion layer closer to the reinforcing fiber comprising at least functional groups on the fiber surface and a hard layer closer to the bulk adhesive composition comprising at least the hard interfacial material. The adhesion layer is responsible for the good adhesion between the reinforcing fiber and the cured adhesive composition. In order to create the reinforced interphase it is required to have a reinforcing fiber having at least a functional group that can react with at least one component of the adhesive composition and to have the surface chemistry of the reinforcing fiber be compatible with the surface chemistry of the interfacial material. Formation of the adhesion layer can occur regardless of the presence of the interfacial material while formation of the hard layer could be further driven by the migrating agent. The adhesion layer might have a thickness no more than 100 nm. A thinner adhesion layer could be more effective than a thicker adhesion layer to drive failure to take place in the hard layer, or between the hard layer and the bulk adhesive composition, or even in the bulk adhesive composition, allowing the fiber reinforced polymer composition to sustain a higher load. The interfacial material is concentrated in-situ in the hard layer during curing of the adhesive composition such that the interfacial material has a gradient in concentration, i.e., the interfacial material is more concentrated when closer to the adhesion layer.

The adhesive composition may optionally include an accelerator. There are no specific limitations or restrictions on the choice of a compound as the accelerator, as long as it can accelerate reactions between the resin and the curing agent and does not deteriorate the effects of the invention. Examples include urea compounds, sulfonate compounds, boron trifluoride piperidine, p-t-butylcatechol, sulfonate compounds, tertiary amines or salts thereof, imidazoles or salts thereof, phosphorus curing accelerators, metal carboxylates and Lewis or Bronsted acids or salts thereof. Examples of suitable urea compounds include N,N-dimethyl-N'-(3,4-dichlorophenyl) urea, toluene bis(dimethylurea), 4,4'-methylene bis(phenyl dimethylurea), and 3-phenyl-1,1-dimethylurea. Commercial products of such a urea compound include DCMU99 (manufactured by Hodogaya Chemical Co., Ltd.), and Omicure (registered trademark) 24, 52 and 94 (all manufactured by CVC Specialty Chemicals, Inc.). Commercial products of an imidazole compound or derivative thereof include 2MZ, 2PZ and 2E4MZ (all manufactured by Shikoku Chemicals Corporation). Examples of a Lewis acid catalyst include complexes of a boron trihalide and a base, such as a boron trifluoride piperidine complex, boron trifluoride monoethyl amine complex, boron trifluoride triethanol amine complex, boron trichloride octyl amine complex. Examples of sulfonate compounds include methyl p-toluenesulfonate, ethyl p-toluenesulfonate and isopropyl p-toluenesulfonate.

The adhesive composition optionally may contain additional additives such as a toughener, an interlayer toughener, or a combination thereof to further improve mechanical properties such as toughness or strength or physical/thermal properties of the cured fiber reinforced polymer composition as long as the effects of the present invention are not deteriorated.

One or more polymeric and/or inorganic tougheners can be used. The toughener may be uniformly distributed in the form of particles in the cured fiber reinforced polymer composition. The particles could be less than 5 microns (µm) in diameter, or even less than 1 µM in diameter. The shortest dimension of the particles could be less than 300 nm. When a toughener is needed to toughen the thermosetting resin in the fiber bed, the longest dimension of a majority of the particles could be no more than 1 µM. A filtering effect in that particles could be concentrated outside a plurality of the reinforcing fibers could result if the longest dimension is greater than 1 µm. Such tougheners include, but are not limited to, elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "Nanostrength®" SBM (polystyrene-polybutadiene-polymethacrylate), and AMA (polymethacrylate-polybutylacrylate-polymethacrylate), both produced by Arkema. Other suitable block copolymers include Fortegra® and the amphiphilic block copolymers described in U.S. Pat. No. 7,820,760B2, assigned to Dow Chemical. Examples of known core-shell particles include the core-shell (dendrimer) particles whose compositions are described in US20100280151A1 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include Nanopox® produced by nanoresins AG. This is a master blend of functionalized nanosilica particles and an epoxy.

The interlayer toughener could be one or more thermoplastics, one or more elastomers, or combinations of one or more elastomers and one or more thermoplastics, or combinations of an elastomer and an inorganic material such as glass, or pluralities of nanofibers or micronfibers. The interlayer toughener could have a form of a particulate or a sheet with a desired thickness (e.g., film, a mat, a woven or a non-woven fabric) and is preferred to be concentrated between two pluralities of the reinforcing fibers in the fiber reinforced polymer composition. In some cases, the sheet form is preferred for ease of manufacturing of the fiber reinforced polymer composition. If the interlayer toughener is a particulate, the average particle size of the interlayer tougheners could be no more than 100 μm, or 10-50 μm, to keep them in the interlayer after curing to provide maximum toughness enhancement. The particles are said to be localized outside of a plurality of the reinforcing fibers. Such particles are generally employed in amounts of up to about 30%, or up to about 15% by weight (based upon the weight of total resin content in the composite composition). Examples of suitable thermoplastic materials include polyamides. Known polyamide particles include SP-500, produced by Toray Industries, Inc., "Orgasol®" produced by Arkema, and Grilamid® TR-55 produced by EMS-Grivory, nylon-6, nylon-12, nylon 6/12, nylon 6/6, and Trogamid® CX by Evonik. If the toughener has a fibrous form, it can be deposited on either surface of a mat of a plurality of the reinforcing fibers impregnated by the adhesive composition. The interlayer toughener could further comprise a curable functional group as defined above that reacts with the adhesive composition. The interlayer toughener could be a conductive material or coated with a conductive material or combination of a conductive material and a non-conductive material to regain z-direction electrical and/or thermal conductivity of the cured fiber reinforced polymer composition that was lost by the introduction of the resin-rich interlayers.

Another embodiment of the invention relates to a fiber reinforced polymer composition comprising a reinforcing fiber and an adhesive composition, wherein the adhesive composition comprises at least a thermosetting resin, a curing agent and a hard interfacial material, wherein the fiber reinforced polymer composition when cured has an interfacial region between the reinforcing fiber and the adhesive composition comprising the hard interfacial material and has a compression strength (CS) of at least 1240 Mpa (180 ksi) and an open-hole compression (OHC) of at least 300 MPa (43.5 ksi).

In this embodiment, a reinforcing fiber is required. There are no specific limitations or restrictions on the choice of a reinforcing fiber as long as the effects of the present invention are not deteriorated. Examples of suitable reinforcing fibers include carbon fibers, organic fibers such as aramid fibers, silicon carbide fibers, metal fibers (e.g., alumina fibers), boron fibers, tungsten carbide fibers, glass fibers, and natural/bio fibers. Selection of an appropriate reinforcing fiber contributing to an interphase formation and good bonds promotion in the fiber reinforced polymer composition has been discussed previously.

The adhesive composition is also required to include a thermosetting resin, a curing agent, a hard interfacial material and optionally a migrating agent, an accelerator, a thermoplastic resin, a toughener, an interlayer toughener or a combination thereof. There are no specific limitations or restrictions on the choice of these components as long as the effects of the present invention are not deteriorated. Examples of these components were described previously.

In one embodiment, the adhesive composition when cured could have a flexural resin modulus (hereafter called "resin modulus", dry measured at room temperature in accordance with a three point bend method described in ASTM D-790) of at least 2.8 GPa, at least 3.5 GPa, at least 4.0 GPa, at least 4.5 GPa, or even at least 5.0 GPa. Note that a higher resin modulus typically leads to a lower flexural deflection. The higher resin modulus provides the cured fiber reinforced polymer composition excellent compression strength, open-hole compression strength and 0° flexural strength in that a higher resin modulus tends to provide the higher strengths and in some cases tension strength and/or 90° flexural strength might be sacrificed to some extent. Yet, when the cured adhesive composition has a flexural deflection of 2 mm, at least 3 mm or even at least 4 mm, the cured fiber reinforced polymer composition can maintain or improve those strengths. Nevertheless, a combination of good bonds and the interphase comprising at least the interfacial material (herein referred to as "a reinforced interphase") could further improve those strengths. Synergistic effects of a combination of (1) the reinforced interphase comprising the hard interfacial material, (2) good bonds and (3) high resin modulus provide an excellent performance envelope comprising at least tensile strength, compressive strength, fracture toughness and interlaminar shear strength of the cured fiber reinforced polymer composition. This might not be achieved by individual elements or the combination of two elements alone.

In another embodiment, in order to achieve high resin modulus for the adhesive resin composition comprising an epoxy resin, epoxy resins having more than two epoxy groups per monomer are suitable. Either an epoxy resin or a curing agent or both could contain at least an amide group to provide both high resin modulus and exceptional adhesion to the reinforcing fibers. The amide group when incorporated in a cured epoxy network could increase resin modulus without penalizing significant strain due to hydrogen bond formations. Such a thermosetting agent, curing agent or additive(s) comprising the amide group or other groups having the aforementioned characteristics is referred to herein as an epoxy fortifying agent or an epoxy fortifier. In such a case a resin modulus of greater than 3.5 GPa and a flexural deflection of at least about 3 mm could be observed. Such systems are important to improve both compressive as well as fracture toughness properties of the fiber reinforced polymer composition. Increasing the number of benzene rings that such a compound has generally leads to a higher resin modulus. In addition, in another embodiment an isomer of either the thermosetting or the curing agent can be used. Isomers herein in the invention refer to compounds comprising identical numbers of atoms and groups, wherein the locations of one or more groups are different. For example, the amide group and the amine group of an aminobenzamide could be located relative to each other on a benzene ring at ortho (1, 2), meta (1, 3), or para (1, 4) positions to form 2-aminobenzamide, 3-aminobenzamide, and 4-aminobenzamide, respectively. Placing the groups at positions which are ortho or meta to each other tends to result in a higher resin modulus as compared to the resin modulus obtained when the groups are positioned para to each other. In another embodiment, a curing agent may comprise at least an amide group and an aromatic group, wherein the amide group is selected from an organic amide group, a sulfonamide group or a phosphoramide group, or collectively their combinations. The amide group provides not only improved adhesion of the adhesive composition to the reinforcing fiber, but also promotes high resin modulus without penalizing strain due to hydrogen bond formations. The curing agent additionally comprises one or more curable functional groups such as nitrogen-containing groups (e.g., an amine group), a hydroxyl group, a carboxylic acid group, and an anhydride group. Amine groups in particular tend to provide higher crosslink density and hence improved resin modulus. A curing agent having at least an amide group and an amine group is herein referred to as an "amidoamine" curing agent. Curing agents having a chemical structure which comprises at least an aromatic group, an amide group and an amine group are referred to herein as "aromatic amidoamines." Generally speaking, increasing the number of benzene rings that an aromatic amidoamine has tends to result in a higher resin modulus.

The additional curable functional group and/or the amide group may be substituted on an aromatic ring. Aromatic amidoamines, for example, are suitable for use as the curing agent in the present invention. Examples of the above-mentioned curing agents include, but are not limited to, benzamides, benzanilides, and benzenesulfonamides (including not only the base compounds but substituted derivatives, such as compounds wherein the nitrogen atom of the amide group and/or the benzene ring is substituted with one or more substituents such as alkyl groups, aryl groups, aralkyl groups, non-hydrocarbyl groups and the like), aminobenzamides and derivatives or isomers thereof, including compounds such as anthranilamide (o-aminobenzamide, 2-aminobenzamide), 3-aminobenzamide, 4-aminobenzamide, aminoterephthalamides and derivatives or isomers thereof such as 2-aminoterephthalamide, N,N'-bis(4-aminophenyl) terephthalamide, diaminobenzanilides and derivatives or isomers thereof such as 2,3-diaminobenzanilide, 3,3-diaminobenzanilide, 3,4-diaminobenzanilide, 4,4-diaminobenzanilide, aminobenzenesulfonamides and derivatives or isomers thereof such as 2-aminobenzenesulfonamide, 3-aminobenzenesulfonamide, 4-aminobenzenesulfonamide (sulfanilamide), 4-(2-aminoethyl)benzenesulfonamide, and N-(phenylsulfonyl)benzenesulfonamide, and sulfonylhydrazides such as p-toluenesulfonylhydrazide. Among the aromatic amidoamine curing agents, aminobenzamides, aminoterephthalamides, diaminobenzanilides, and aminobenzenesulfonamides are suitable to provide excellent resin modulus and ease of processing.

Another method to achieve the required resin modulus could be to use a combination of the above epoxy resins and benzoxazine resins for the required thermosetting resin. In this case, the benzoxazine resin behaves as a curing agent and no additional curing agent is required. An accelerator as defined above, however, might be used to speed up the curing process. Examples of suitable benzoxazine resins include, but are not limited to, multi-functional n-phenyl benzoxazine resins such as phenolphthaleine based, thiodiphenyl based, bisphenol A based, bisphenol F based, and/or dicyclopentadiene based benzoxazines. When an epoxy resin or a mixture of epoxy resins with different functionalities is used with a benzoxazine resin or a mixture of benzoxazine resins of different kinds, the weight ratio of the epoxy resin(s) to the benzoxazine resin(s) could be between 0.01 and 100. Yet another method is to incorporate high modulus additives into the adhesive composition. Examples of high modulus additives include, but are not limited to, oxides (e.g., silica), clays, polyhedral oligomeric silsesquioxanes (POSS), carbonaceous materials (e.g., carbon nanotubes with and without substantial alignment, carbon nanoplatelets, carbon nanofibers), fibrous materials (e.g., nickel nanostrand, halloysite), ceramics, silicon carbides, diamonds, and mixtures thereof.

In addition to the above, the interfacial region between the reinforcing fiber and the adhesive composition comprises at least the interfacial material to form a reinforced interphase necessary to reduce stress concentration in this region and allow a substantially improved envelope performance of the cured reinforced polymer composition, which could not be achieved without such a reinforced interphase. In order to create the reinforced interphase it is required to have the reinforcing fiber provide a compatible surface chemistry to the surface chemistry of the interfacial material and optionally a migrating agent is needed to further promote the migration of the interfacial material into a vicinity of the reinforcing fiber. The interfacial material is concentrated in-situ in the interfacial region during curing of the fiber reinforced polymer composition such that the interfacial material has a gradient in concentration in the interfacial region, i.e., the interfacial material is more concentrated closer to the reinforcing fiber than further away. The resulting cured fiber reinforced polymer with the reinforced interphase could have primarily at least 1240 MPa (180 ksi), at least 1380 MPa (200 ksi), or even at least 1520 MPa (220 ksi) of compression strength, at least 300 MPa (43.5 ksi), at least 310 MPa (45 ksi) or even at least 330 MPa (48 ksi) of open-hole compression strength and furthermore at least 70% and up to 100% translation of tensile strength, and at least 90 MPa (13 ksi), or even at least 104 MPa (15 ksi) of interlaminar shear strength.

An embodiment of a multifunctional fiber reinforced polymer composition of the present invention relates to tailoring an adhesive composition by selecting from the above a thermosetting resin comprising at least an epoxy resin, a curing agent, a multifunctional interfacial material, a migrating agent and their relative amounts to provide an adhesive composition which when cured has a resin modulus of at least 2.8 GPa, at least 3.2 GPa, at least 4 GPa, or even at least 5 GPa and a high flexural deflection of at least about 2 mm, and achieving (in combination with a reinforcing fiber in the cured fiber reinforced polymer composition having an interphase at least comprising the multifunctional interfacial material) a high adhesion with an interlaminar shear strength (ILSS) of at least 90 MPa (13 ksi) or even at least 104 MPa (15 ksi), a high tensile strength with a translation of at least 70% and up to 100%, a compression strength of at least 1240 MPa (180 ksi), at least 1380 Mpa (200 ksi), or even at least 1520 MPa (220 ksi), an open hole compression of at least 300 MPa (43.5 ksi), at least 310 MPa (45 ksi), or even at least 330 MPa (48 ksi) and/or at least a z-direction electrical conductivity of at least 1 S/m, or even at least 2 S/m.

In all embodiments related to the above fiber reinforced polymer compositions, the curing agent(s) are employed in an amount up to about 75 parts by weight per 100 parts by weight of total thermosetting resin (75 phr). The curing agent might also be used in an amount higher or lower than a stoichiometric ratio between the thermosetting resin equivalent weight and the curing agent equivalent weight to increase resin modulus or glass transition temperature or both. In such cases, an equivalent weight of the curing agent is varied by the number of reaction sites or active hydrogen atoms and is calculated by dividing its molecular weight by the number of active hydrogen atoms. For example, an amine equivalent weight of 2-aminobenzamide (molecular weight of 136) could be 68 for 2 functionality, 45.3 for 3 functionality, 34 for 4 functionality, and 27.2 for 5 functionality.

There are no specific limitations or restrictions on the choice of a method of making a fiber reinforced polymer composition as long as the effects of the present invention are not deteriorated.

In one embodiment, for example, a method of making a fiber reinforced polymer composition is provided, the method comprising combining a reinforcing fiber and an adhesive composition, wherein the adhesive composition comprises at least a thermosetting resin, a curing agent and a hard interfacial material, the reinforcing fiber is suitable for concentrating the hard interfacial material in-situ during cure in an interfacial region between the reinforcing fiber and the adhesive composition, and the interfacial region comprises the interfacial material.

In another embodiment, a fiber reinforced polymer composition may be prepared by a method comprising impregnating a carbon fiber with an adhesive composition comprised of at least an epoxy resin, an interfacial material comprising a nanosilica having at least a functional group (for example, an epoxy group) on its surface that is compatible with the surface chemistry of the reinforcing fiber, a curing agent as defined above and a migrating agent selected from the group consisting of polyethersulfones, polyetherimides, and combinations thereof, wherein the interfacial material is concentrated in-situ in an interfacial region during curing of the epoxy resin such that the interfacial material has a gradient in concentration in the interfacial region, and the interfacial material has a higher concentration in a vicinity of the carbon fiber than further away from the carbon fiber.

Another embodiment relates to a method to create a reinforced interphase in a fiber reinforced polymer composition, wherein a resin infusion method with a low resin viscosity is utilized. In such a case, a migrating agent is concentrated outside a fiber fabric and/or a fiber mat that is stacked to make a desired preform. An adhesive composition comprising at least a thermosetting resin, a curing agent, and an interfacial material is pressurized and infiltrated into the preform, allowing some of the migrating agent to partially mix with the adhesive composition during the infiltration process and penetrate the preform. By having some of the migrating agent in the adhesive composition, the reinforced interphase could be formed during cure of the fiber reinforced polymer composition. The remainder of the migrating agent is concentrated in the interlayer between two fabric sheets or mats and could improve the impact and damage resistance of the fiber reinforced polymer composition. Thermoplastic particles with an average size less than 50 μm could be used as the migrating agent. Examples of such thermoplastic materials include but are not limited to polysulfones, polyethersulfones, polyamides, polyamideimides, polyimides, polyetherimides, polyetherketones, and polyetheretherketones, their derivatives, similar polymers, and mixtures thereof.

The fiber reinforced polymer compositions of the present invention may, for example, be heat-curable or curable at room temperature. In another embodiment, the aforementioned fiber reinforced polymer compositions can be cured by a one-step cure to a final cure temperature, or a multiple-step cure in which the fiber reinforced polymer composition is dwelled (maintained) at a certain dwell temperature for a certain period of dwell time to allow an interfacial material in the fiber reinforced polymer composition to migrate onto the reinforcing fiber's surface, and ramped up and cured at the final cure temperature for a desired period of time. The dwell temperature could be in a temperature range in which the adhesive composition has a low viscosity. The dwell time could be at least about five minutes. The final cure temperature of the adhesive resin composition could be set after the adhesive resin composition reaches a degree of cure of at least 20% during the ramp up. The ramp rate could be at least 0.5° C./min, at least 5° C./min, at least 20° C./min or even at least 50° C./min. The final cure temperature could be about 220° C. or less, or about 180° C. or less. The fiber reinforced polymer composition could be kept at the final cure temperature until a degree of cure reaches at least 80%. Vacuum and/or external pressure could be applied to the reinforced polymer composition during cure. Examples of these methods include autoclave, vacuum bag, pressure-press (i.e., one side of the article to be cured contacts a heated tool's surface while the other side is under pressurized air with or without a heat medium), or a similar method. Note that other curing methods using an energy source other than thermal, such as electron beam, conduction method, microwave oven, or plasma-assisted microwave oven, or combination could be applied. In addition, other external pressure methods such as shrink wrap, bladder blowing, platens, or table rolling could be used.

For fiber reinforced polymer composites, one embodiment of the present invention relates to a manufacturing method to combine fibers and resin matrix to produce a curable fiber reinforced polymer composition (sometimes referred to as a "prepreg") which is subsequently cured to produce a composite article. Employable is a wet method in which fibers are soaked in a bath of the resin matrix dissolved in a solvent such as methyl ethyl ketone or methanol, and withdrawn from the bath to remove solvent.

Another suitable method is a hot melt method, where the epoxy resin composition is heated to lower its viscosity, directly applied to the reinforcing fibers to obtain a resin-impregnated prepreg; or alternatively, as another method, the epoxy resin composition is coated on a release paper to obtain a thin film. The film is consolidated onto both surfaces of a sheet of reinforcing fibers by heat and pressure.

To produce a composite article from the prepreg, for example, one or more plies are applied onto a tool surface or mandrel. This process is often referred to as tape-wrapping. Heat and pressure are needed to laminate the plies. The tool is collapsible or removed after curing. Curing methods such as autoclave and vacuum bag in an oven equipped with a vacuum line could be used. A one-step cure cycle or multiple-step cure cycle in that each step is performed at a certain temperature for a period of time could be used to reach a cure temperature of about 220° C. or even 180° C.

or less. However, other suitable methods such as conductive heating, microwave heating, electron beam heating and similar methods, can also be employed. In an autoclave method, pressure is provided to compact the plies, while a vacuum-bag method relies on the vacuum pressure introduced to the bag when the part is cured in an oven. Autoclave methods could be used for high quality composite parts. In other embodiments, any methods that provide suitable heating rates of at least 0.5° C./min, at least 1° C./min, at least 5° C./min, or even at least 10° C./min and vacuum and/or compaction pressures by an external means could be used.

Without forming prepregs, the adhesive composition may be directly applied to reinforcing fibers which are conformed onto a tool or mandrel for a desired part's shape, and cured under heat. The methods include, but are not limited to, filament-winding, pultrusion molding, resin injection molding and resin transfer molding/resin infusion, vacuum assisted resin transfer molding.

The resin transfer molding method is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

The filament winding method is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

The pultrusion method is a method in which reinforcing fibers are continuously passed through an impregnating tank filled with a liquid thermosetting resin composition to impregnate them with the thermosetting resin composition, followed by a squeeze die and heating die for molding and curing, by continuously drawing them using a tensile machine. Since this method offers the advantage of continuously molding fiber-reinforced composite materials, it is used for the manufacture of reinforcement fiber fiber-reinforced plastics (FRPs) for fishing rods, rods, pipes, sheets, antennas, architectural structures, and so on.

Composite articles in accordance with the invention are advantageously used in sports applications, general industrial applications, and aerospace and space applications. Concrete sports applications in which these materials are advantageously used include golf shafts, fishing rods, tennis or badminton rackets, hockey sticks and ski poles. Concrete general industrial applications in which these materials are advantageously used include structural materials for vehicles, such as automobiles, bicycles, marine vessels and rail vehicles, drive shafts, leaf springs, windmill blades, pressure vessels, flywheels, papermaking rollers, roofing materials, cables, and repair/reinforcement materials.

Tubular composite articles in the invention are advantageously used for golf shafts, fishing rods, and the like.

Examination of a Reinforced Interphase

For visual inspection, a high magnification optical microscope or a scanning electron microscope (SEM) could be used to document the failure modes and location/distribution of an interfacial material. The interfacial material could be found on the surface of the fiber along with the adhesive composition after the bonded structure fails. In such cases, mixed mode failure or cohesive failure of the adhesive composition is possible. Good particle migration refers to about 50% or more coverage of the particles on the fiber surface (herein referred to as "particle coverage"), no particle migration refers to less than about 5% coverage, and some particle migration refers to about 5-50% coverage. While a particle coverage of at least 50% is needed to simultaneously improve a wide range of mechanical properties of the fiber reinforced polymer composites, in some cases a particle coverage of at least 10% or even at least 20% is suitable to improve some certain desired properties.

Several methods are known to one skilled in the art to examine and locate the presence of the interfacial material through thickness. An example is to cut the composite structure at 90°, 45° with respect to the fiber's direction. The cut cross-section is polished mechanically or by an ion beam such as argon, and examined under a high magnification optical microscope or electron microscope. SEM is one possible method. Note that in the case where SEM cannot observe the interphase, other available state-of-the-art instruments could be used to document the existence of the interphase and its thickness through another electron scanning method such as TEM, chemical analyses (e.g., X-ray photoelectron spectroscopy (XPS), Time-of-Flight Secondary Ion Mass Spectrometry (ToF-SIMS), infrared (IR) spectroscopy, Raman, the alike or similar) or mechanical properties (e.g., nanoindentation, atomic force microscopy (AFM)), or a similar method.

An interfacial region or an interphase where the interfacial material is concentrated can be observed and documented. The interphase is typically measured from the fiber's surface to a definite distance away where the interfacial material is no longer concentrated compared to the concentration of the interfacial material in the surrounding resin-rich areas. Depending on the amount of the cured adhesive found between two fibers, the interphase could be extended up to 100 micrometers, comprising one or more layers of the interfacial material of one or more different kinds. The interphase thickness could be up to about 1 fiber diameter, comprising one or more layers of the interfacial material of one or more different kinds. The thickness could be up to about ½ of the fiber diameter.

EXAMPLES

Next, certain embodiments of the invention are illustrated in detail by means of the following examples using the following components:

| Component | Product name | Manufacturer | Description |
|---|---|---|---|
| Epoxy | ELM434 | Sumitomo Chemical Co., Ltd. | Tetraglycidyl diaminodiphenyl methane with a functionality of 4, having an average EEW of 120 (ELM434) |
| | Araldite ® MY0610 | Huntsman Advanced Materials | Triglycidyl meta-aminophenol with a functionality of 3, having and average EEW of 100 (MY610) |

-continued

| Component | Product name | Manufacturer | Description |
|---|---|---|---|
| | Epon ® 828 | Momentive Specialty Chemicals | Difunctional bisphenol A/epichlorohydrin, having an average EEW of 188 (EP828) |
| | Epon ® 825 | Momentive | Diglycidyl ether of bisphenol A with a functionality of 2, having an average EEW of 177 (EP825) |
| | Epiclon ® 830 | Dainippon Ink and Chemicals, Inc. | Diglycidyl ether of bisphenol F with a functionality of 2, having an average EEW of 177 (EPc830) |
| | Epon ® 2005 | Momentive | Diglycidyl ether of bisphenol A with a functionality of 2, having an average EEW of 1300 (EP2005) |
| | GAN | Nippon Kayaku K.K. | Glycidylaniline with a functionality of 2 and having an average EEW of 166 (GAN) |
| | F-a Type benzoxazine | Shikoku Chemicals Corporation | Bisphenol-F benzoxazine Type 1, equivalent weight 217 (BOX-F) |
| Migrating agent | Sumikaexcel ® PES5003P | Sumitomo Chemical Co., Ltd. | Polyethersulfone, MW 38,200 (PES1) |
| | VW-10700RP | Solvay | Polyethersulfone, MW 21,000 (PES2) |
| | Ultem ® 1000P | Sabic | Polyetherimide (PEI) |
| Thermoplastic particle | Grilamid ® TR55 | EMS-Grivory | Polyamide (PA) |
| Curing agent | Aradur ® 9664-1 | Huntsman Advanced Materials | 4,4'-diaminodiphenyl sulfone (4,4-DDS) |
| | Aradur ® 9719-1 | Huntsman Advanced Materials | 3,3-diaminodiphenyl sulfone (3,3-DDS) |
| | Anthranilamide | Sigma Aldrich | 2-Aminobenzamide or anthranilamide (AAA) |
| Accelerator | Ethyl p-toluenesulfonate | Sigma Aldrich | Ethyl p-toluenesulfonate (EPTS) |
| Interfacial material | Kane Ace MX416 | Kaneka Texas Corporation | 25 wt % core-shell rubber (CSR) particles having core composition of polybutadiene (CSR) in epoxy |
| | Silica-X | Toray Industries, Inc. | Epoxy functionalized silica powder 100 nm in an epoxy mixture (Silica) |
| Fiber | T700GC-12K-31E | Toray Industries, Inc. | 12,000 fibers, tensile strength 4.9 GPa, tensile modulus 240 GPa, tensile strain 2.0%, type-3 sizing for epoxy resin systems (T700G-31) |
| | MX-12K-30E | Toray Industries, Inc. | 12,000 fibers, tensile strength 4.9 GPa, tensile modulus 370 GPa, tensile strain 1.2%, density 1.77 g/cm$^3$, type-3 sizing for epoxy resin systems (MX-30) |
| | T800GC-24K-31E | Toray Industries, Inc. | 24,000 fibers, tensile strength 5.9 GPa, tensile modulus 290 GPa, tensile strain 2.0%, type-3 sizing for epoxy resin systems (T800G-31). |

Silica-X material (an epoxy-functionalized nanosilica) was made by incorporating AngstromSphere silica powder (100 nm) purchased from Fiber Optic Center, Inc. into a mixture of epoxies according to the below recipes in Table 1. Glycidoxypropyltrimethoxy silane (GPS) was purchased from Gelest. Silica powder was placed in a solution of 3 wt % GPS in methanol/DI water (95/5 wt %) and stirred for 90 min. The solids were removed by a centrifuge and redispersed into fresh methanol. The procedure was repeated two times to obtain a final dispersion of functionalized silica in methanol. The dispersion was mixed with the epoxy mixture and methanol was removed under heat and vacuum.

MX fibers were made using a similar PAN precursor in a similar spinning process as T800S fibers. However, to obtain a higher modulus, up to a maximum carbonization temperature of 3000° C. could be applied. For surface treatment and sizing application, similar processes were utilized. For these MX fibers, a ratio of oxygen to carbon was found to be about 0.1.

Comparative Examples 1-2 and Examples 1-6

Comparative Examples 1-2 and Examples 1-4 show the effects of a hard interphase versus a soft interphase and no interphase on mechanical properties of a fiber composite system. T700G-31 fibers were used.

Appropriate amounts of each component of a resin composition were charged into a mixer preheated at 100° C. After charging, the temperature was increased to 160° C. while the mixture was agitated, and held for 1 hr. After that, the mixture was cooled to 65° C. and the curing agent was charged. The final resin mixture was agitated for 1 hr, then discharged and a portion was stored in a freezer.

Some of the hot mixture was degassed in a planetary mixer rotating at 1500 rpm for a total of 20 min, and poured into a metal mold with 0.25 in thick Teflon® insert. The resin was heated to 180° C. at a ramp rate of 1.7° C./min, allowed to dwell for 2 hr to complete curing, and finally cooled down to room temperature. Resin plates were prepared for testing according to ASTM D-790 for flexural test.

To make a prepreg, the hot resin was first cast into a thin film using a knife coater onto a release paper. The film was consolidated onto a bed of fibers on both sides by heat and compaction pressure. A UD prepreg having a carbon fiber area weight of about 190 g/m² and resin content of about 35% by weight was obtained. The prepregs were cut and hand laid up with the sequence listed in Table 2 for each type of mechanical test, followed an ASTM procedure and a z-direction electrical conductivity test. Panels were cured in an autoclave at 180° C. for 2 hr with a ramp rate of 1.7° C./min and a pressure of 0.59 MPa.

As shown, since there was strong adhesion between an epoxy resin system and T700G-31 fibers, ILSS was found to be at least 15 ksi for all the systems. Yet, when a soft interphase was tailored by the CSR material as in Comparative Example 2, OHC strength was reduced to about 40 ksi compared to the OHC strength of Comparative Example 1 (about 41 ksi) in which there was no interphase. Nevertheless, when silica was introduced into the interphase of Examples 1-2, OHC was increased up to about 47 ksi, such that the higher the amount of silica used, the higher OHC was. Note that the higher amount of silica in Example 2 than Example 1 was used to increase the resin modulus of this system further but it did not affect the function of the interphase. When the PES2 migrating agent was replaced by the PEI migrating agent in Example 3, there was not much difference in the performance observed between these respective systems. Ultimately, when the interlayer toughener PA was introduced into Example 2 to create Example 4, a significant increase in mode II fracture toughness $G_{II}C$ was observed.

Examples 5-6 show the effects of high resin modulus on OHC. Higher modulus resins than previous Examples were created by replacing 4,4-DDS curing agent with 3,3-DDS (Example 5) and AAA (Example 6) while keeping the amount of silica the same. With the increase in resin modulus, surprisingly, OHC further increased without sacrificing other properties (in some cases, other properties were actually enhanced).

Comparative Examples 3-6 and Examples 7-11

Resins, prepreg and mechanical tests were performed using procedures as in previous Examples. These systems show the advantage of a hard interphase over resin modulus for improvement of OHC. T800G-31 fiber was used.

Comparative Examples 3-6 showed that OHC increases with resin modulus. However, after resin modulus reached about 4 GPa, OHC leveled out at about 47 ksi. Further increases in resin modulus did not result in higher OHC. Nevertheless, when a hard interphase was introduced in Example 7-11, OHC was further increased up to 54 ksi. This significant enhancement suggests the importance of a hard interphase in overcoming the OHC barrier that a high resin modulus alone could not have achieved.

Example 12

Resin, prepreg and mechanical tests were performed using procedures as in previous Examples. A high modulus carbon fiber, MX-30, was used. As shown, when an interphase was tailored successfully, both OHC and ILSS were achieved that were similar or better than lower modulus carbon fiber composite systems.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. The numerical ranges disclosed inherently support any range within the disclosed numerical ranges though a precise range limitation is not stated verbatim in the specification because this invention can be practiced throughout the disclosed numerical ranges. Finally, the entire disclosures of the patents and publications referred in this application are hereby incorporated herein by reference for all purposes.

TABLE 1

| | | | C. E. 1 | C. E. 2 | Ex. 1 | Ex. 2 | Ex. 3 | Ex. 4 | Ex. 5 | Ex. 6 | C. E. 3 | C. E. 4 |
|---|---|---|---|---|---|---|---|---|---|---|---|---|
| Resin matrix composition (phr) | Epoxy | ELM434 | 60 | 60 | 60 | 60 | 60 | 60 | 60 | 60 | 60 | 60 |
| | | MY610 | 0 | 0 | 0 | 0 | 0 | 0 | 0 | 0 | 0 | 0 |
| | | EPON825 | 20 | 20 | 20 | 20 | 25 | 25 | 20 | 20 | 0 | 20 |
| | | EPc830 | 20 | 20 | 20 | 20 | 15 | 15 | 0 | 10 | 25 | 0 |
| | | Ep828 | 0 | 0 | 0 | 0 | 0 | 0 | 0 | 0 | 15 | 0 |
| | | Epon 2005 | 0 | 0 | 0 | 0 | 0 | 0 | 0 | 10 | 0 | 0 |
| | | GAN | 0 | 0 | 0 | 0 | 0 | 0 | 20 | 0 | 0 | 20 |
| | | BOX-F | 0 | 0 | 0 | 0 | 0 | 0 | 0 | 0 | 0 | 0 |
| | Curing agent | 4,4-DDS | 45 | 45 | 45 | 45 | 45 | 45 | 0 | 0 | 0 | 0 |
| | | 3,3-DDS | 0 | 0 | 0 | 0 | 0 | 0 | 45 | 0 | 45 | 45 |
| | | AAA | 0 | 0 | 0 | 0 | 0 | 0 | 0 | 31 | 0 | 0 |
| | Accelerator | EPTS | 0 | 0 | 0 | 0 | 0 | 0 | 0 | 0 | 0 | 0 |
| | Interfacial material | CSR | 0 | 5 | 0 | 0 | 0 | 0 | 0 | 0 | 0 | 0 |
| | | Silica | 0 | 0 | 10 | 25 | 25 | 25 | 25 | 25 | 0 | 0 |
| | Migrating agent | PES1 | 0 | 0 | 0 | 0 | 0 | 0 | 12 | 0 | 12 | 12 |
| | | PES2 | 12 | 12 | 12 | 12 | 0 | 12 | 0 | 14 | 0 | 0 |
| | | PEI | 0 | 0 | 0 | 0 | 9 | 0 | 0 | 0 | 0 | 0 |
| | Optional | PA | 0 | 0 | 0 | 0 | 0 | 30 | 0 | 0 | 0 | 0 |
| Fiber (wt %) | MX-30 | | 0 | 0 | 0 | 0 | 0 | 0 | 0 | 0 | 0 | 0 |
| | T800G-31 | | 0 | 0 | 0 | 0 | 0 | 0 | 100 | 100 | 100 | 100 |
| | T700G-31 | | 100 | 100 | 100 | 100 | 100 | 100 | 0 | 0 | 0 | 0 |
| Cured resin | Flexure modulus @ RTD (GPa) | | 3.3 | 3.1 | 3.7 | 4.1 | 4.1 | 4.0 | 4.9 | 5.5 | 3.2 | 3.9 |
| Interphase | Particle coverage | Yes: >50% Some >30% No: <5% | No | Yes | Yes | Yes | Yes | Yes | Yes | Yes | No | No |

TABLE 1-continued

| | | | | | | | | | | | | | |
|---|---|---|---|---|---|---|---|---|---|---|---|---|---|
| CFRP | Tension | Ultimate strength* (ksi) | 343 | 337 | 366 | 376 | 384 | 370 | 394 | 448 | 404 | 424 |
| | | Translation (%) | 70 | 68 | 88 | 90 | 91 | 90 | 91 | 100 | 80 | 83 |
| | Adhesion | ILSS (ksi) | 16.3 | 15.0 | 16.9 | 17.6 | 17.0 | 17.5 | 20.1 | 16.1 | 14.9 | 15.2 |
| | Fracture toughness | $G_{IC}$ (lb · in/in2) | 1.2 | 2.1 | 3.0 | 3.3 | 3.0 | 3.4 | 3.5 | 2.5 | 3.4 | 2.5 |
| | | $G_{IIC}$ (lb · in/in2) | 4.5 | 4.8 | 5.0 | 5.0 | 4.6 | 12.0 | 5.3 | | 4.6 | 4.8 |
| | Compression* | OHC (ksi) | 41.2 | 40.2 | 44.5 | 46.5 | 45.0 | 45.9 | 51.5 | 45.0 | 41.1 | 43.3 |
| | | Ultimate strength (ksi) | 241 | 219 | 230 | 251 | 255 | 245 | 248 | 240 | 199 | 237 |

| | | | C. E. 5 | C. E. 6 | Ex. 7 | Ex. 8 | Ex. 9 | Ex. 10 | Ex. 11 | Ex. 12 |
|---|---|---|---|---|---|---|---|---|---|---|
| Resin matrix composition (phr) | Epoxy | ELM434 | 60 | 40 | 60 | 60 | 60 | 60 | 40 | 60 |
| | | MY610 | 0 | 0 | 0 | 0 | 20 | 0 | 0 | 0 |
| | | EPON825 | 0 | 0 | 20 | 20 | 0 | 0 | 0 | 20 |
| | | EPc830 | 0 | 0 | 0 | 0 | 0 | 0 | 0 | 10 |
| | | Ep828 | 0 | 0 | 0 | 0 | 0 | 0 | 0 | 0 |
| | | Epon 2005 | 0 | 0 | 0 | 0 | 0 | 0 | 0 | 10 |
| | | GAN | 40 | 0 | 20 | 20 | 20 | 0 | 0 | 0 |
| | | BOX-F | 0 | 60 | 0 | 0 | 0 | 40 | 60 | 0 |
| | Curing agent | 4,4-DDS | 45 | 0 | 0 | 0 | 0 | 0 | 0 | 0 |
| | | 3,3-DDS | 0 | 0 | 45 | 45 | 50 | 0 | 0 | 0 |
| | | AAA | 0 | 0 | 0 | 0 | 0 | 0 | 0 | 31 |
| | Accelerator | EPTS | 0 | 2 | 0 | 0 | 0 | 2 | 2 | 0 |
| | Interfacial material | CSR | 0 | 0 | 0 | 0 | 0 | 0 | 0 | 0 |
| | | Silica | 0 | 0 | 10 | 25 | 10 | 25 | 25 | 25 |
| | Migrating agent | PES1 | 0 | 0 | 12 | 12 | 12 | 0 | 0 | 0 |
| | | PES2 | 14 | 12 | 0 | 0 | 0 | 12 | 12 | 14 |
| | | PEI | 0 | 0 | 0 | 0 | 0 | 0 | 0 | 0 |
| | Optional | PA | 0 | 0 | 0 | 0 | 0 | 0 | 0 | 0 |
| Fiber (wt %) | | MX-30 | 0 | 0 | 0 | 0 | 0 | 0 | 0 | 100 |
| | | T800G-31 | 100 | 100 | 100 | 100 | 100 | 100 | 100 | 0 |
| | | T700G-31 | 0 | 0 | 0 | 0 | 0 | 0 | 0 | 0 |
| Cured resin | Flexure modulus @ RTD (GPa) | | 4.2 | 5.1 | 4.5 | 4.9 | 5.1 | 4.7 | 5.6 | 5.5 |
| Interphase | Particle coverage | Yes: >50% Some >30% No: <5% | No | No | Yes | Yes | Yes | Yes | Yes | Yes |
| CFRP | Tension | Ultimate strength* (ksi) | 455 | 445 | 435 | 430 | 427 | 460 | 440 | 280 |
| | | Translation (%) | 90 | 85 | 85 | 84 | 83 | 94 | 88 | 86 |
| | Adhesion | ILSS (ksi) | 15.2 | 14.8 | 18.5 | 19.1 | 18.7 | 15.2 | 15.0 | 16.1 |
| | Fracture toughness | $G_{IC}$ (lb · in/in2) | 2.0 | 2.6 | 3.3 | 3.2 | 3.1 | 3.0 | 2.8 | 2.5 |
| | | $G_{IIC}$ (lb · in/in2) | | | | | | | | |
| | Compression* | OHC (ksi) | 47.0 | 48.0 | 50.0 | 52.0 | 53.0 | 49.0 | 54.0 | 47.0 |
| | | Ultimate strength (ksi) | 235 | 245 | 242 | 250 | 255 | 235 | 255 | 235 |

*normalized to $v_f = 60\%$

TABLE 2

| Test Panel | Test method | Panel Size (mm × mm) | Ply Lay-up Configuration | Test Condition |
|---|---|---|---|---|
| 0deg-Tensile | ASTM D 3039 | 300 × 300 | $(0)_6$ | RTD |
| Compression strength | ASTM D 695/ ASTM D 3410 | 300 × 300 | $(0)_6$ | RTD |
| ILSS | ASTM D-2344 | 300 × 300 | $(0)_{12}$ | RTD |
| OHC | ASTM D-6484 | 350 × 350 | $[+45/0/-45/90]_{2S}$ | RTD |
| DCB (for $G_{IC}$) | ASTM D 5528 | 350 × 300 | $(0)_{20}$ | RTD |
| ENF (for $G_{IIC}$) | JIS K 7086* | 350 × 300 | $(0)_{20}$ | RTD |

*Japanese Industrial Standard Test Procedure

Translation Factor.

Percent translation is a measure of how effectively a fiber's strength is utilized in a fiber reinforced polymer composite. It was calculated from the equation below, where a measured tensile strength (TS) is normalized by a measured strand strength of fibers and fiber volume fraction ($V_f$) in the fiber reinforced polymer composite. Note that $V_f$ can be determined from an acid digestion method.

$$\% \text{ translation} = \frac{TS}{\text{Strand strength} \times V_f} \times 100$$

What is claimed is:

1. A fiber reinforced polymer composition comprising a reinforcing fiber and an adhesive composition, wherein the adhesive composition comprises at least a thermosetting resin, a curing agent and an interfacial material having at least a component with a glass transition temperature (Tg) of at least −50° C., wherein a surface of the interfacial material comprises at least a functional group compatible with the reinforcing fiber, wherein the reinforcing fiber is suitable for concentrating the interfacial material in an interfacial region between the reinforcing fiber and the adhesive composition and for providing an interlaminar shear strength (ILSS) value as determined by ASTM D-2344 of at least 16 ksi, wherein the interfacial region comprises an adhesion layer and a hard layer, the adhesion layer is closer to the reinforcing fiber than the hard layer and has a composition different from the composition of the hard layer, wherein the hard layer comprises at least the interfacial material, and wherein the interfacial material is silica functionalized with an epoxy group.

2. The fiber reinforced polymer composition of claim 1, wherein the adhesive composition when cured forms good bonds to the reinforcing fiber.

3. The fiber reinforced polymer composition of claim 1, wherein the component of the interfacial material has a Tg of at least 0° C.

4. The fiber reinforced polymer composition of claim 3, wherein the component of the interfacial material has a modulus effective to provide a ratio of the modulus of the interfacial material to the modulus of the adhesive composition of at least 1.

5. The fiber reinforced polymer composition of claim 4, wherein the adhesive composition further comprises a migrating agent.

6. The fiber reinforced polymer composition of claim 5, wherein the adhesive composition further comprises at least one of an accelerator, a thermoplastic resin, a toughener, an interlayer toughener, or a combination thereof.

7. A method of manufacturing a composite article comprising curing the fiber reinforced polymer composition of claim 1.

\* \* \* \* \*